United States Patent [19]

Lanteri

[11] 4,183,897

[45] Jan. 15, 1980

[54] APPARATUS FOR ADMIXING LIQUID AND GASEOUS CHEMICAL REACTANTS WITH UNIFORM PRESSURE IN A PLURALITY OF REACTION TUBES

[75] Inventor: Agostino Lanteri, Busto Arsizio, Italy

[73] Assignee: Costruzioni Meccaniche G. Mazzoni S.p.A., Busto Arsizio, Italy

[21] Appl. No.: 639,971

[22] Filed: Dec. 11, 1975

Related U.S. Application Data

[60] Division of Ser. No. 451,200, Mar. 14, 1974, Pat. No. 3,931,273, which is a continuation of Ser. No. 114,973, Feb. 12, 1971, abandoned.

[30] Foreign Application Priority Data

Feb. 23, 1970 [IT] Italy ................................ 20991 A/70

[51] Int. Cl.$^2$ ...................... B01J 10/00; C07C 143/00
[52] U.S. Cl. .................... 422/197; 261/112; 422/202
[58] Field of Search ..................... 23/283, 284, 285; 260/458, 505 R; 261/112, 99; 422/197, 202

[56] References Cited

U.S. PATENT DOCUMENTS

| | | | |
|---|---|---|---|
| 3,482,947 | 12/1969 | Jacobsen et al. | 23/285 |
| 3,667,919 | 6/1972 | Denzler et al. | 23/285 |
| 3,677,714 | 7/1976 | Ledgett | 23/285 |

*Primary Examiner*—Michael S. Marcus
*Attorney, Agent, or Firm*—Young & Thompson

[57] ABSTRACT

Liquid and gaseous chemical reactants are admixed and reacted in a plurality of elongated reaction tubes, for example in the course of sulfonating and sulfating liquid organic compounds with sulfur trioxide gas. To keep the pressure uniform among the plural tubes, a minor proportion of inert gas is introduced into an annular space in which is also introduced the liquid reactant, this annular space surrounding the gaseous reactant introduction space at the mouth of each reaction tube. The inert pressure equalizing gas is fed to all the reaction tubes from a common chamber with which all the tubes communicate.

2 Claims, 5 Drawing Figures

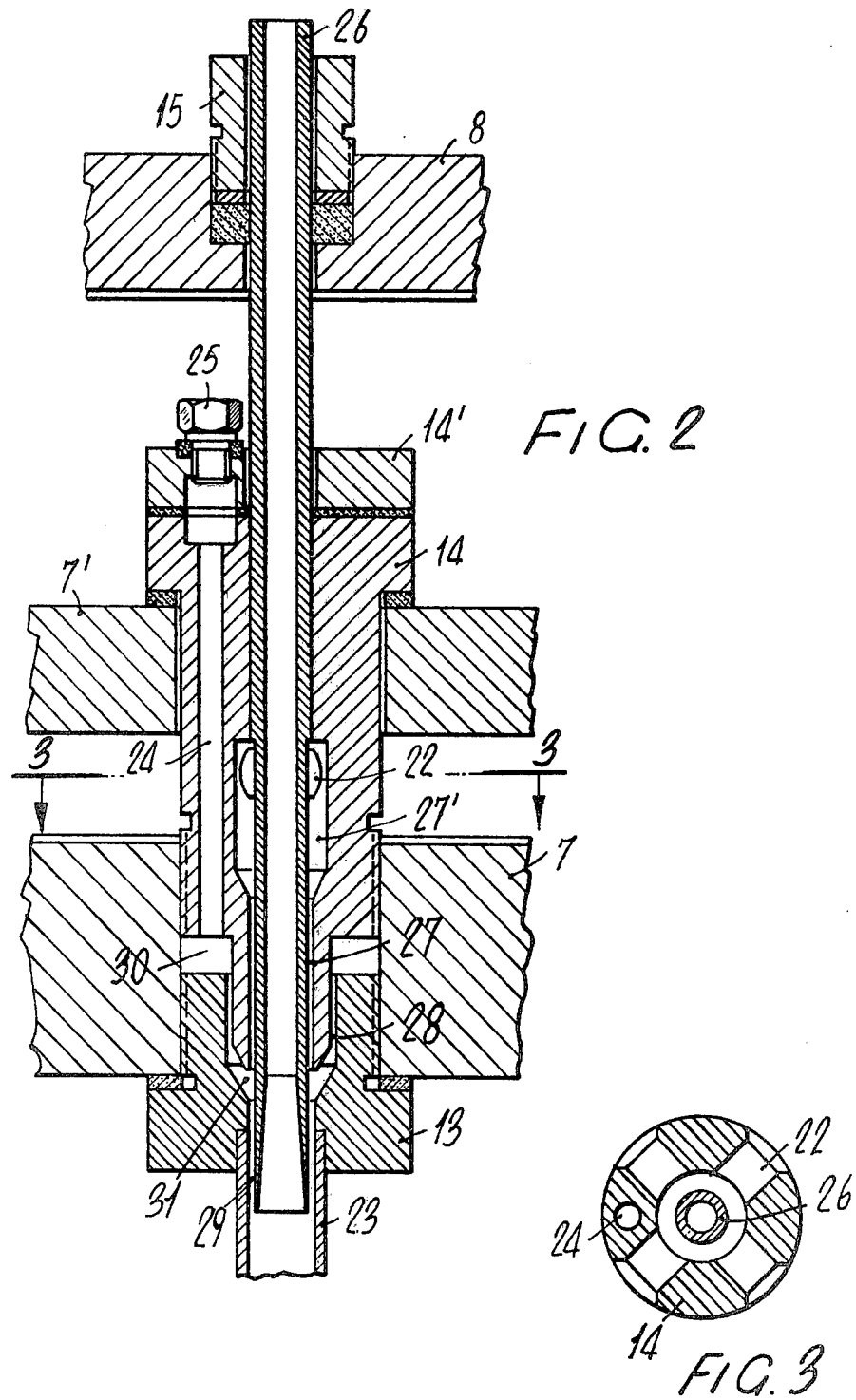

APPARATUS FOR ADMIXING LIQUID AND GASEOUS CHEMICAL REACTANTS WITH UNIFORM PRESSURE IN A PLURALITY OF REACTION TUBES

This is a division of application Ser. No. 451,200, filed Mar. 4, 1974, now U.S. Pat. No. 3,931,273, Jan. 6, 1976 which is a continuation of Ser. No. 114,973 filed Feb. 12, 1971, abandoned.

This invention relates to apparatus for admixing liquid and gaseous chemical reagents with uniform pressure in a plurality of reaction tubes, useful for example in sulfonating and sulfating liquid organic compounds with sulfur trioxide gas. As used herein, the term "liquid" means that the organic compounds to be processed are liquid at room temperature or at the temperature at which they are reacted with sulfur trioxide.

More particularly, this invention relates to apparatus for reacting organic compounds with gas such as a gas sulfur trioxide in a parallel conduit two-phase gas-liquid flow system. The method is applicable to all of the organic compounds capable of reacting with diluted sulfur trioxide, either forming sulfonates or sulfates.

Methods are known for carrying out gas/liquid reactions in flow systems having two cocurrent phases, wherein the required turbulence for causing the interphase contact and heat exchange is essentially achieved at the charge of the gas stream energy. To this end, elongated reaction zones are generally used in the form of conduits or tubes where the gas and liquid reactants are continuously introduced from the same end. For example, U.S. Pat. No. 2,528,320 describes such reaction techniques for paraffin sulfochlorination with a mixture of gas sulfur dioxide and chlorine, characterized in that the superficial gas speed is kept at a sufficiently high rate to cause an annular turbulent flow. This type of flow is characterized in that the liquid is caused by the gas speed to circumferentially flow on the inner tube walls, as in the central portion the gas flows around the tube axis. U.S. Pat. No. 2,865,958 describes a sulfonating method, according to which a mineral oil containing olefine hydrocarbons and/or aromatic hydrocarbons and gas containing sulfur trioxide are introduced from an end into a tubular chamber. The organic liquid circumferentially enters the chamber and is dispersed in the gas jet centrally penetrating therein.

In most cases, such as in producing organic sulfonates and sulfates for detergents and similar uses, the reaction of the organic compounds with sulfur trioxide is extremely rapid and exothermic. Moreover, several products being obtained in this reaction, particularly organic sulfuric esters, are unstable. Suitable means have to be used for ensuring an even contact of the reactants, a ready removal of the reaction heat and a short stay period of the product in the reaction zone. Otherwise, chargings and other undesirable effects would occur, which could adversely effect the quality of the final product. In these circumstances, an annular turbulent flow is definitely useful, as enabling an even interphase contact and an efficient temperature control by circulating cooling liquid outside the walls encircling the reaction zone.

According to U.S. Pat. No. 2,923,728, an annular turbulent flow for the liquid organic compound is established on the inner walls of a tube by propelling by an inert gas, as a mixture of sulfur trioxide and another inert diluent gas is introduced into the central zone of the tube. This method is suitable for reduced scale productions. A laboratory apparatus grounded on this principle is described in Soap & Chemical Specialities, May 1967, page 67. It includes a downward vertical flow reaction tube having an inner diameter of 5 mm.

An increase in flow rate would involve an increase in the tube diameter and length and, at the same time, an increase in flow speed. However, there are limits to this purpose because the gas supply pressure may become undue and/or the product quality may be lowered. Good reaction conditions are achieved by tubes of a comparatively small diameter or conduits in the form of rectangular or annular slit with a reduced thickness.

Industrial reactors generally include a single reaction zone in the form of an annular conduit between two concentric cylindrical surfaces, having a free cross-section suitable to the intended flow rate, or a plurality of parallel reaction zones in the form of circular tubes. These are downward moving vertical systems, wherein an annular type of flow is naturally established in a wide range of gas speeds. However, it is important to maintain an essentially high speed for the gas phase in order to provide the liquid phase with speed and turbulence, thereby ensuring a smooth reaction, an efficient temperature control and a short stay time of the product in the reaction zone.

In these reactors the problem arises for evenly distributing the liquid and gas reactants throughout the single reaction zone or in all of the parallel reaction zones. In this connection, known methods have several disadvantages.

In the case of annular conduit reactors (see British Pat. No. 1,029,029), a uniform free cross section is required throughout the reaction zone. This gives rise to highly strict accuracy problems in construction, particularly where large reactors for important industrial productions are concerned. British Pat. No. 1,103,441 describes a reactor in the form of an annular conduit provided with a cage stirring member rotating in the initial portion of the reaction zone in order to ensure an even distribution and contact for the reactants. However, this approach requires the use of a mechanical stirrer which has to rotate at a high speed closely adjacent the two surfaces.

Particularly, in those reactors where liquid and gas would flow in completely separate parallel conduits, such as the tubular reactors this invention is related to, an even distribution of the liquid and gas reactants is hampered by the changes which may occur in flow resistance of the several elements. These changes may depend on changes in the inner diameter within the ranges of commercial tolerances or in the roughness on the inner surfaces. A certain change (in absolute length rate) in the inner diameter would cause a percentage change in pressure drop which is the higher as smaller is the tube diameter. Accordingly, while the reaction conditions improve as the inner diameter of the tubes decreases, the conditions for evenly distributing the reactants become more unfavourable. These changes may be enhanced in the long run because of unevenesses in corrosion and erosion. In addition to this, it occurs in a two-phase gas-liquid flow that an increase in liquid flow rate or in liquid viscosity would cause an increase in the resistance to gas flow. Accordingly, it may occur that in a reaction tube, where the liquid flow rate has an excess error (due to the metering element), there would be a shortage of gas flow rate, whereby in the reactant ratio there will be an overall error which is the sum of the two errors. The same may occur in a tube where the liquid flow rate shows an error in shortage. Finally, there may be slightly different reaction conditions from one tube to another, which may result in changes in pressure drop of the gas flow rate.

U.S. Pat. No. 3,169,142 describes a reactor formed of tubes having an inner diameter of about 11 mm., in which the distribution of the liquid reactant to the various tubes is effected by means of nozzles capable of building up a high pressure drop in order to minimize the effect of possible changes in the pressure downstream the nozzles on the liquid flow rate. Similarly, the distribution of the gas reactant is effected by means of nozzles capable of building up a high pressure drop relative to that in the reaction tubes. Thus, possible changes in the tube resistance would scarcely affect the gas flow rate of each element, since the latter depends on the overall pressure drop of the nozzle and tube. In this system the drawback is in that most of the gas stream energy has to be dissipated in the distributing nozzles and only a comparatively small portion is available for flow in the reaction tubes. Therefore, the gas speed or rate in the reaction tubes has to be limited: substantially it is in the order of 15 m/sec., referred to the tube section. As a result of this, the gas and liquid flow rate per tube is rather low. An increase in the liquid flow rate, without a corresponding increase in the gas flow rate, can be provided within determined limits by increasing the sulfur trioxide concentration in the gas, but this is normally prejudicial to the quality and particularly to the colour of the product. Additionally, in most cases it is considerably advantageous to operate with a substantially higher gas speed or rate, preferably in the range of 35-65 m/sec. in order to provide the liquid phase in the reaction tubes with turbulence and speed. Under these conditions a rapid and even reaction occurs in all of the liquid portions with a short stay time and minimum alteration of the product. However, this requires some consumption of the gas stream energy, particularly in the case of sulfonation and sulfation products having a substantial viscosity at reaction temperature. To provide for this energy, it is necessary that a sufficient pressure drop be available in said tubes.

The method of the present invention enables to provide a substantially even distribution of the liquid and gas reactants to a plurality of parallel reaction tubes independently within sufficiently wide ranges of the changes in flow resistance which may occur in the several tubes, without any need for this to restrict the pressure drop in said tubes. To this end, the present method provides a substantial pressure equalization in all the parallel reaction tubes immediately downstream of the distributing nozzles for the liquid and gas reactants.

Accordingly, this invention relates to a method for sulfonating and sulfating liquid organic compounds by diluted gas sulfur trioxide with inert gas in a plurality of externally cooled, downward flowing parallel reaction tubes, characterized in that the reaction tubes at the injection nozzles for the liquid and gas reactants communicate with a single uniform pressure chamber, additional inert gas freely flowing therefrom to the several reaction tubes, so as to substantially equalize the pressures downstream of all of the injection nozzles for the liquid and gas reactants. This additional inert gas is hereinafter referred to as equalizing gas. As a principle, the equalizing gas freely flows to the reaction tubes when the inlet pressure drops are negligible in relation to the pressure drops in the injection nozzles for the gas reactant. In most cases of practical application for the present method, a sufficiently even distribution of the reactants is provided when the inlet pressure drops of the equalizing gas are some units percent at the most of the pressure drop in the injection nozzles for the gas reactant. Under these conditions, the equalizing gas will be distributed to the reaction tubes, so that the overall gas flow rate of each tube is a decreasing function of the resistance thereof against the gas flow. It is apparent from the foregoing that the substantial pressure equalization downstream of the distributing nozzles for the liquid and gas reactants is depending on a substantial equalization of pressure drops in all of the reaction tubes. Generally, the amount of equalizing gas would vary approximately in the range of 8%-19% of the total amount of inert gas flowing in each tube. Generally, the inert equalizing gas is air. The equalizing gas may be introduced into the reaction tubes concentrically between the liquid reactant supplied to the inner surfaces of the tubes and the gas reactant injected into the central zone of each tube, or may be introduced together with the liquid reactant through convergent-shaped inlets of the reaction tubes and encircling the injection nozzles for the gas reactant.

For a more detailed description of the characteristics of the present method, reference is made to the accompanying drawings, in which:

FIG. 1 is a diagrammatic vertical sectional view showing a reactor for carrying out the method according to the invention (in this figure, $A_1$ indicates $SO_3$+inert diluent gas; $B_1$ a liquid organic reactant; C an equalizing inert gas; D a vent; E the cooling water outlet; and F the cooling water inlet);

FIG. 2 is a detailed view showing the device for introducing the reactants and equalizing gas into the reaction tubes according to FIG. 1;

FIG. 3 is a horizontal sectional view showing the device in FIG. 2 at the inlet apertures for the equalizing gas;

Figure 1:
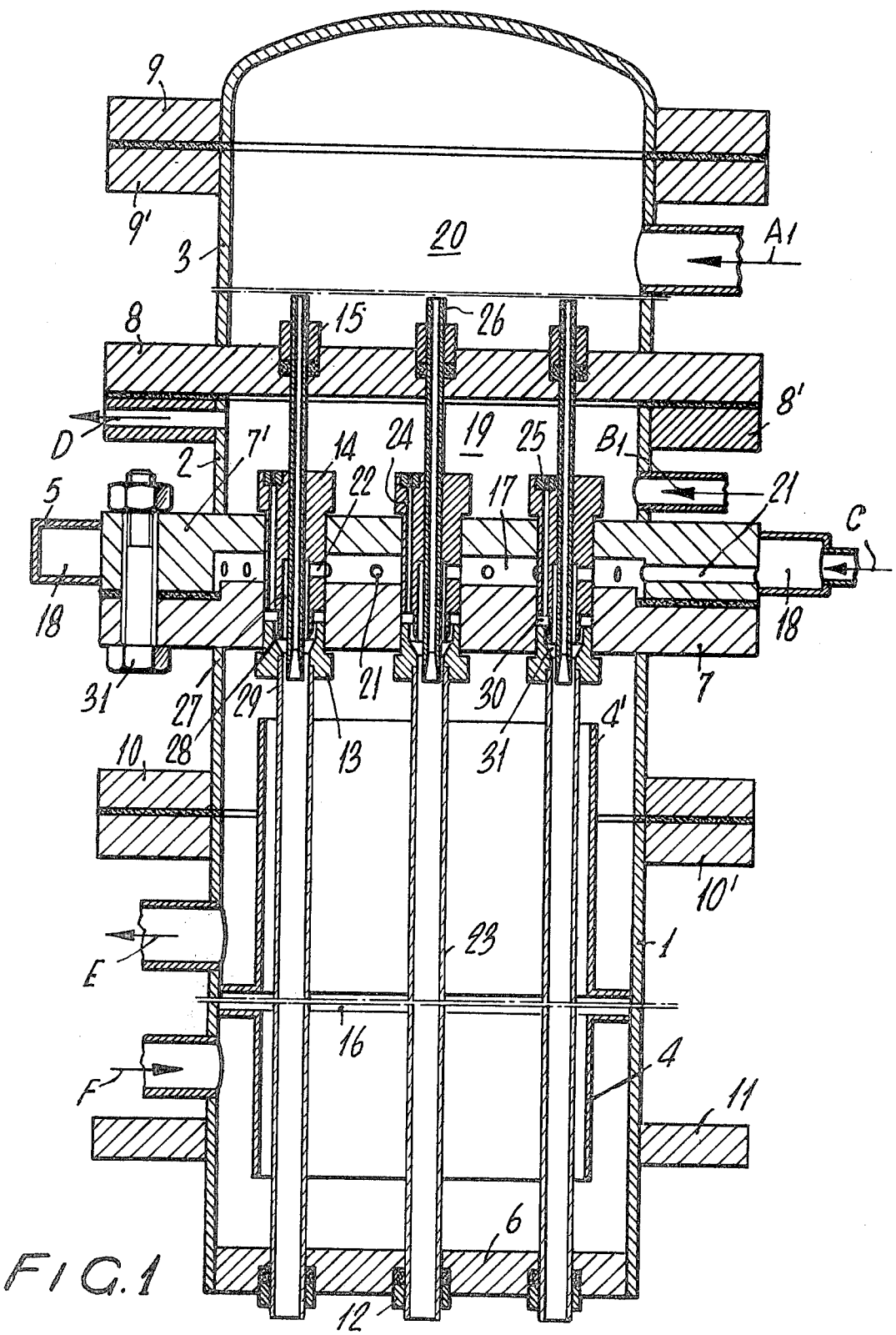

As shown in FIG. 1, the reactor is formed of a preferably vertical cylindrical housing or shell 1 enclosing plurality of reaction tubes 23 (for simplicity, three only of such tubes being shown in the figure, but the reactor can comprise up to more than one hundred tubes). At the lower end thereof the tubes are secured to the plate 6 by means of sealing elements 12, while being welded at the upper end thereof to threaded connectors 13; these are sealingly clamped (by suitable seals) in the lower portion of threaded holes in the flanged plate 7. The housing or shell 1, plates 6 and 7 and walls of tubes 23 enclose the chamber 16, in which cooling water can be circulated from end to end by baffles 4 and 4'. For an efficient cooling, in chamber 16 there are also provided transverse partitions or other known devices (not shown in the drawing). The inner diameter of tubes 23 can be within about 8-18 mm. However, an internal diameter of 8-13 mm. is generally preferably to provide a sufficient flow rate per tube and an acceptable quality of product. In order to obtain the desired reaction degree, the tube length should increase as the inner diameter increases. Generally, the tube length is 0.8-5.0 meters and preferably 1.0–3.5 meters. A flanged plate 7' is fixedly mounted on flanged plate 7 and has holes at the threaded holes in flanged plate 7, the connectors 14 passing therethrough and being clamped at the upper portion of the threaded holes in plate 7 so as to seal (by suitable seals) on the flanged plate 7'. The connectors 14 carry the elements for introducing the reactants and gas into the reaction tubes. A chamber 17 is provided between the flanged plates 7 and 7' and communicates with the annular chamber 18 formed by the housing or shell 5 which is welded outside the flanged plate 7'. The annular chamber 18 communicates with chamber 17 by means of radial holes 21 in the protruded portion on the flange of plate 7. By means of this connection, some inert gas can be supplied to chamber 17 and distributed therefrom as equalizing gas, as described below. A chamber 19 is located over the flanged plate 7' and defined at the top by the separating flanges plate 8 and laterally by the cylindrical housing or shell 2, the liquid organic reactant being supplied from this chamber 19 to the reaction tubes by means of the distributing nozzles 25 mounted on the connectors 14. The top portion of the reactor between the separating flanged plate 8 and the flange cover or lid 9 and laterally defined by the cylindrical shell or housing 3 comprises the chamber 20, from which the gas reactant is supplied to the reaction tubes by means of the distributing nozzles 26 centrally secured to the connectors 14 and passing through the separating flanged plate 8; the latter is provided with holes as the threaded holes in the flanged plate 7', fitted with sealing elements 15. The flange 11 is for connecting the reactor to the outlet conduit.

The elements for introducing the reactants and equalizing gas into the reactor in FIG. 1 are shown in greater detail in FIGS. 2 and 3. As metered by means of nozzle 25, the liquid organic reactant moves down the conduit 24 to the space 30 between the connectors 13 and 14 in the threaded hole in plate 7; by means of the annular aperture 28 between the inner cylindrical surface of connector 13 and the outer cylindrical extension surface of connector 14 and the conical connector 31, the liquid is distributed therefrom on the periphery externally defining the annular aperture 29 opening into the reaction tube 23. The gas reactant is metered by means of nozzle 26 and concentrically injected into the innermost portion of reaction tube 23. Preferably, the outlet mouth of nozzles 26 is flared by a cone angle of about 7°. The equalizing gas enters the radial holes 22 of connector 14, travels along the annular conduit 27 between the inner cylindrical surface of the final section of connector 14 and the outer surface of nozzle 26 and penetrates the reaction tube 23 concentrically between the liquid reactant and the gas reactant jet. The annular apertures 28 are of a rather narrow width to cause the liquid to be distributed on the whole periphery, but such however to exhibit only a minimal flow resistance. Generally, this port is between 0.5 and 1.2 mm. Preferably, the width of the annular apertures 29 is in the range of 1.0–1.8 mm and the length thereof is in the range of 5–30 mm.

Figure 4:
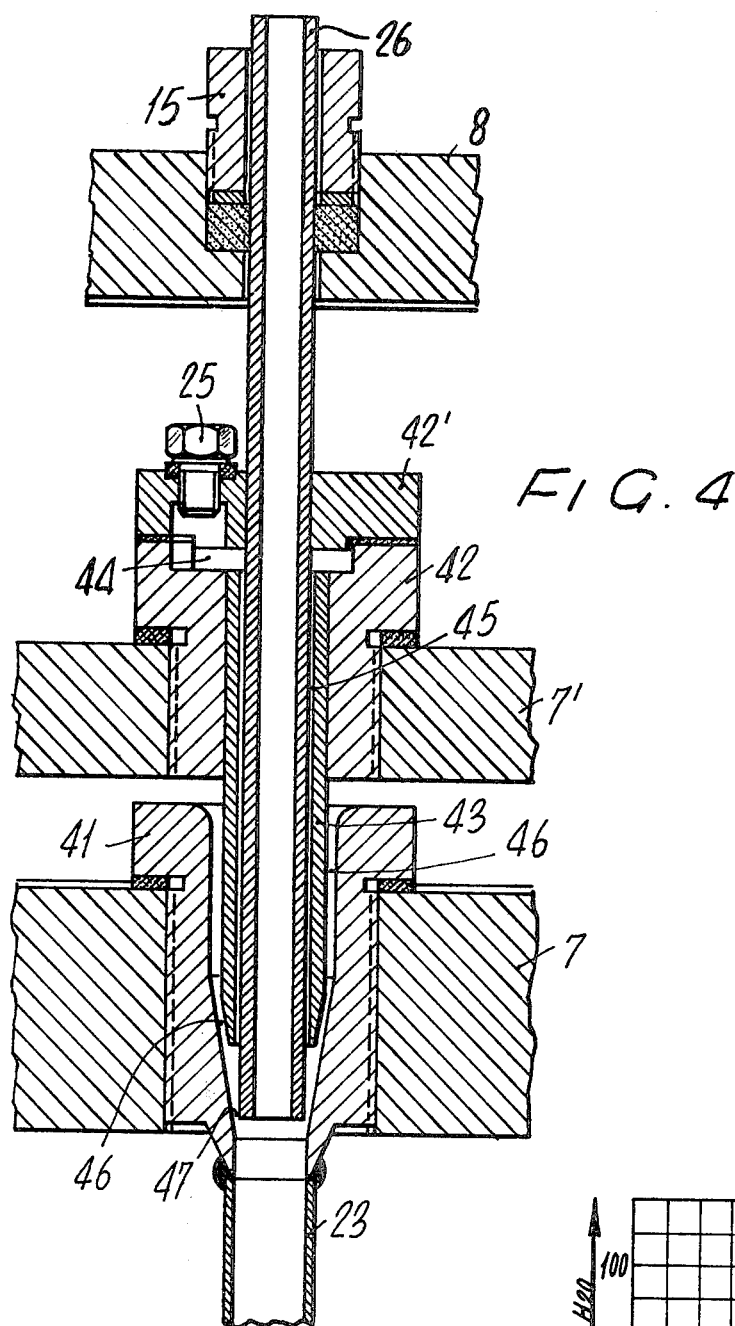
FIG. 4 is a view showing another form for introducing the reactants and equalizing gas into the reaction tubes for use in the method according to the present invention.

FIG. 4 shows a further convenient arrangement for introducing the reactants and equalizing gas into the reaction tubes. Plates 7 and 7' are provided with threaded holes which are identical and properly overlying for receiving the connectors 41 and 42. An end portion of connectors 41 are convergent by a cone angle of about 22°. Connectors 42 have a tubular extension 43 enclosing the gas nozzle 26 and forming an annular passage 45, through which the liquid organic reactant downward moves to the apertures 47 between the end conical surface of connector 41 and the outer rim of nozzle 26. The equalizing gas gets to this aperture passing through the annular conduit 46 between the inner surfaces of connector 41 and the outer surfaces of the tubular extension 43. Through said aperture 47, the liquid organic reactant and equalizing gas are concurrently introduced into the reaction tube 23 externally of the gas jet emerging from the nozzle 26. Good results are obtained when the outer diameter of nozzles 26 is substantially the same as the inner diameter of the reaction tubes 23 and the end of nozzle 26 is recessed by 2.0–3.5 mm from the converging end of connector 41, whereby the width of aperture 47 is the range of about 0.4–0.7 mm. The arrangement in FIG. 4 is particularly fitted for reaction tubes having an inner diameter of 6–10 mm. In these cases, also the arrangement in FIG. 2 can be used, however requiring the use of gas reactant injection nozzles having a small diameter to provide a suitable width for the annular apertures 29. However, the arrangement in FIG. 4 can be used also with reaction tubes of a larger diameter and affording, for example, substantially the same results as those obtained by the arrangement in FIG. 2 in the case of reaction tubes having an inner diameter of 13 mm.

The equalizing gas in chamber 17 flows from periphery to centre while being distributed to the reaction tubes 23 through holes 22 and annular conduits 27 (FIG. 2) or annular conduits 46 (FIG. 4). The pressure differential building up between the periphery and centre of chamber 17 because of the gas flow will vary depending on the diameter of the chamber or the number of reaction tubes and the equalizing gas flow rate, however being always quite negligible and in the order of 1 mm. water column, or less.

The inlet pressure drop of the equalizing gas in reaction tubes 23 is mostly localized at apertures 29 (FIG. 2) or 47 (FIG. 4), where the gas flows together with the liquid organic reactant. The width of apertures 29 or 47 will depend on the liquid organic reactant flow rate related to the inner perimeter unit for tubes 23 and minimal and maximal equalizing gas flow rates. At the minimal flow rate, the inlet speed of the equalizing gas should be sufficient to prevent the gas jet emerging from nozzles 26 from diffusing into the apertures 29 or 47. Such a diffusion may cause a premature reaction of the organic compound with sulphur trioxide and colour development. On the other hand, the inlet pressure drops, within the flow rate range required for equalizing the changes in resistance of tubes 23, should be at a maximum some units percent of the pressure drop provided by the gas reactant nozzles 26. In the above shown apertures, the inlet pressure drops are generally within 20–120 mm water column for equalizing gas flow rates in the range of 8–19% of the total inert gas flow rate per tube. In order to set up the above ratio of pressure drops the nozzles 26 are dimensioned in connection with the gas reactant flow rate, so as to set up a pressure drop generally in the range of 0.10–0.35 kg/cm$^2$.

The highest difference in pressure downstream of the gas reactant distribution nozzles is given by the difference in inlet pressure drops for the equalizing gas corresponding to the maximal and minimal flow rates. This difference is related to the maximal difference in resistances of the parallel reaction tubes. The maximal percentage difference in gas reactant distribution to the reaction tubes is as from the following relation:

$$\left( \sqrt{\frac{\Delta P}{\Delta P \Delta(\Delta_p \max - \Delta_p \min)}} - 1 \right) \times 100$$

wherein $\Delta P$ is the pressure drop at the gas reactant nozzles, while $\Delta_p$ max and $\Delta_p$ min are the inlet pressure drops for the equalizing gas corresponding to the maximal flow rate and minimal flow rate, respectively. Similarly, the maximum difference in liquid reactant distribution can be estimated. Since the pressure drops caused by gas flows in holes 22 and conduits 27 (FIG. 2) or conduits 26 (FIG. 4) are about 30% or less of the total inlet pressure drop for the equalizing gas, the pressure differential downstream of the liquid distribution nozzles is minimal. Accordingly, nozzles can be used having a pressure drop which is comparatively low when related to the required liquid flow rate. This is desirable in order to avoid a too high speed for the liquid, which may cause erosion on the inner surfaces of the calibrated holes.

The pressure drop in the reaction tubes 23 may be also substantially higher than that in nozzles 26. Therefore, the restrictions in the prior art can be overcome as to the liquid flow rate and gas speed in the reaction tubes.

The gas speed in the reaction tubes, as related to the tube cross-section, is generally in the range of 20–80 m/sec., preferably 35–65 m/sec. At lower speeds than the minimal level indicated, the interphase contact may be unsatisfactory, or the liquid phase may be overheld in the reaction zone. Within the above shown speed range, an interphase mixing occurs which increases as the gas speed increases; the interphase surface is complex and liquid portions would leave the continuous phase for entering the gas phase and then re-entering the continuous liquid phase. For speeds exceeding the maximal level indicated, liquid portions would tend to be gradually and more firmly suspended in the gas phase as minute droplets which may unduly react with sulfur trioxide or be drawn by the outlet exhausted gas.

The concentration of sulfur trioxide in the gas, as the latter contacts the liquid organic reactant, is generally in the range of 2–12% by volume, preferably 3–6% by volume. The molar ratio of sulfur trioxide and organic compound will vary according to the nature of the latter and is in the range of 0.9–1.2, more generally 0.95–1.15.

The gas reactant containing sulfur trioxide can be obtained by evaporating commercial stabilized liquid sulfur trioxide or sulfur trioxide obtained by oleum distillation in a stream of inert gas, such as nitrogen, carbon dioxide or more usually dry air, or by elemental sulfur combustion in a stream of dry air and conversion of sulfur dioxide to sulfur trioxide. In any case, a flow of gas or dry air can be by-passed ahead of the gas sulfur trioxide production system and used as equalizing gas.

The gas reactant containing sulfur trioxide is supplied to the reactor under a pressure of about 0.3–1.3 kg/cm² and at a convenient temperature in order not to result in condensation and obstruction of the distribution nozzles or solidification of the organic compound within the supply chamber. In the case of high melting point organic compounds, also the equalizing gas should be at a convenient temperature to avoid solidification at the inlet of the reaction tubes.

The reaction temperature will vary according to viscosity and melting point of the liquid phase and generally is in the range of about 30°–110° C. To this end, it should be noted that the temperature will vary along the reaction tubes: it increases instantaneously at the initial contact zone of the reactants because of the extremely fast reaction, whereupon the heat subtracted by external cooling will gradually prevail on the heat generated by the reaction and the temperature will drop.

The reaction tubes may be of such a length as to allow the mixture cooling to a temperature at which the product is quite stable to be transferred to further processing, or of a length just sufficient to provide a substantially complete absorption of sulfur trioxide; in the latter case, the reaction product is further cooled at the reactor outlet, before or after separating the exhausted gas, by contact and mixing with a pre-cooled product.

The method of the present invention is applicable to sulfonating and sulfating all of the organic compounds capable of reacting in a liquid state with gas sulfur trioxide. The compounds may be unitary, or mixtures of homologous elements or isomers, or both. Examples of these compounds are olefines having a linear or branched chain containing 8 to 20 carbon atoms with an inner or end double bond (alpha olefines); the aromatic hydrocarbons and aromatic hydrocarbons substituted by a linear or branched alkyl chain containing up to 25 carbon atoms, such as alkyl benzenes and particularly dodecylbenzene and tridecylbenzene and fatty alcohols having a linear or branched chain containing 8 to 20 carbon atoms, such as lauryl alcohol and cetyl-stearyl alcohol; the condensation products of ethylene oxide with fatty alcohols and fatty acids having 8 to 20 carbon atoms and with alkylphenols having an alkyl chain comprising 8 to 16 carbon atoms; the fatty acids containing 8 to 20 carbon atoms. Also mixtures of compounds having a different chemical structures can be used as starting materials, such as alkylbenzenes and fatty alcohols and also mixtures of compounds reacting with sulfur trioixde with other compounds not reacting therewith, such as fractions of mineral oils containing aromatic products.

Furthermore, the method of the present invention can be used also for other gas/liquid reactions occurring with heat development or absorption, provided that still an inert gas may be used as equalizing gas.

EXAMPLE 1

Figure 5:
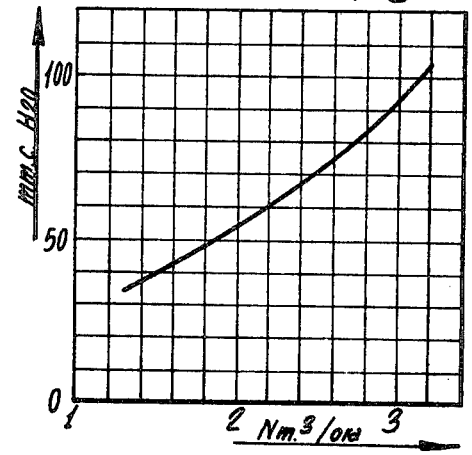
FIG. 5 is a diagram showing the inlet pressure drops for the equalizing air in a device as shown in FIG. 2.

This example relates to the gas reactant distribution in a reactor as shown in FIG. 1, formed of commercial drawn pipes having a rated inner diameter of 11 mm. and a length of 1850 mm. The reactor is designed for a liquid reactant flow rate of 7.2 kg/h per tube (referred to dodecylbenzene) and a total air flow rate of 17 Nm³/h. The annular inlet apertures for the liquid reactant and equalizing air have a width of 1.5 mm and a length of 20 mm. Under the above set forth conditions and under a pressure of 0.5 kg/cm² (in the equalizing air chamber), the inlet pressure drops for the equalizing air are graphically shown in FIG. 5. The superficial air speed in the reaction tubes, referred to the tube cross-section, is about 50 m/sec. The average equalizing air flow rate is 2 Nm³/h per tube. The main air stream of 15 Nm³/h per tube is used for sulphur trioxide dilution. The equalization for changes in total air flow rate is contemplated, as due to changes in tube resistance, within a maximum of 6%, that is within 1 Nm³/h per tube. Thus, the equalizing air flows to the several tubes in amounts from 1.5 to 2.5 Nm³/h per tube. The inlet pressure drops for the equalizing air are of 40 and 70 mm water column, respectively. By using gas reactant distribution nozzles capable of providing a pressure drop of 0.20 kg/cm², the maximal difference in distribution is:

$$\left(\sqrt{\frac{2000}{2000-(70-40)}}-1\right)\times 100=0.75\%$$

EXAMPLE 2

This example shows the sulfonation of commercial dodecyl benzene having a branched side chain and average molecular weight of 245. The characteristics of the reactor and the air flow rates are as shown in Example 1. A molar ratio of sulfur trioxide and organic reactant of 1.07 is used. The organic reactant is supplied to the reactor in a rate of 7.2 kg/h per tube and sulfur trioxide is evaporated at the main air stream in a rate of 2.52 kg/h per tube. The concentration of sulfur trioxide at the gas reactant is 4.5 M by volume; as an average, it drops to 4% by volume when the gas reactant encounters the equalizing air and contacts the organic reactant. The temperature of the organic reactant is 20° C., whereas the temperature of the gas reactant is 45° C. Cooling water is circulated within the reactor at a temperature of 34° C. The pressure in the gas reactant supply chamber is 0.75 kg/cm², whereas the pressure in the equalizing air chamber is 0.55 kg/cm². The reaction mixture exits from the reactor at 60° C. After separation of the exhausted gas, dodecylbenzene sulfonic acid is rapidly cooled at 42° C., then kept in digestion for 20 minutes to complete the reaction and finally hydrated with 1% water to decompose the residual anhydrides. Dodecylbenzene sulfonic acid contains 1.6% unsulfonated material (determined by extracting with petroleum ether the product meutralized with sodium hydroxide) and 1.6% sulfuric acid. The product neutralized with sodium hydroxide in 5% aqueous solution of active material has a colour corresponding to 40 on the Klett scale (40 mm. cell, No. 42 filter).

For a reactor according to the prior art, formed of tubes having approximately the same dimensions as those used in this example, a flow rate is shown of about 5 kg/h dodecyl benzene per tube, but with a concentration of sulfur trioxide in the gas reactant of about 8% by volume. According to experiments, a reduction in sulfur trioxide concentration in the gas reactant to 4-5% by volume would enable to substantially improve the product colour; however, this involves a substantial reduction in dodecyl benzene flow rate in order to maintain the pressure drop within the reaction tubes at an acceptable value for an even distribution of the reactants.

EXAMPLE 3

This example relates to sulfation of a commercial fraction of linear synthetic fatty alcohols having an even number of carbon atoms, preferably $C_{12}$ and $C_{14}$. It is quite similar to commercial lauryl alcohol and has an average molecular weight of 198. The characteristics of the reactor and air flow rates are the same as in Example 1. A molar ratio of sulfur trioxide and organic compound of 1.00 is used. The organic reactant is supplied to the reactor in a rate of 6 kg/h per tube and sulfur trioxide is evaporated in the main air stream in a rate of 2.42 kg/h per tube. The concentration of sulfur trioxide in the gas reactant is 4.3% by volume; as an average, it drops to 3.8% by volume when the gas reactant encounters the equalizing air and contacts the organic reactant. The organic reactant has a solidification temperature of about 22° C. and is supplied to the reactor at 29° C. The temperature of the gas reactant is 40° C. Cooling water at 29° C. is circulated within the reactor. In the gas reactant supply chamber the pressure is 0.53 kg/cm², and in the equalizing air chamber the pressure is 0.30 kg/cm². The reaction mixture exits from the reactor at 37° C. After separation of the exhausted gas, the resultant fatty alcohol sulfate is rapidly cooled to 32° C. and then neutralized with a 6% sodium hydroxide solution in a continuous mixer provided with cooling. During neutralization, the temperature is maintained at 36° C. The neutralized product contains 3.0% petroleum ether extract and 1.2% sodium sulfate on the basis 100% active material. The 5% aqueous solution of active material has a colour corresponding to 20 units on the Klett scale.

For a reactor of the prior art, formed of tubes having approximately the same dimensions as those used in this example, the flow rate shown is about 2.3 kg/h of lauryl alcohol per tube, while sulfur trioxide concentration in the gas reactant is 4.5% by volume.

EXAMPLE 4

This example relates to sulfation of a commercial fraction of linear synthetic alcohols having an even number of carbon atoms, principally $C_{16}$, $C_{18}$ and $C_{20}$ and an average molecular weight of 263. The characteristics of the reactor and air flow rates are the same as shown in Example 1; a molar ratio of sulfur trioxide and organic reactant of 0.98 is used. The organic reactant is supplied to the reactor at a rate of 7.2 kg/h per tube and sulfur trioxide is evaporated in the main air stream at a rate of 2.14 kg/h per tube. Sulfur trioxide concentration in the gas reactant is 3.9% by volume and as an average it drops to 3.4% by volume when the gas reactant encounters the equalizing air and contacts the organic reactant. The solidification temperature of the organic reactant is 44.7° C., the latter being supplied to the reactor at 52° C. The gas reactant temperature is 46° C. and the equalizing air is pre-heated at 50° C. Cooling water at 44° C. is circulated within the reactor. In the gas reactant supply chamber the pressure is 0.6 kg/cm² and in the equalizing air chamber the pressure is 0.36 kg/cm². The reaction mixture exits from the reactor at 51° C. After separation of the exhausted gas, the resultant fatty alcohol sulfate is rapidly cooled to 45° C., then neutralized continuously with 5% sodium hydroxide solution, maintaining the temperature at 45° C. The neutralized product clearly dissolves in hot water. It contains 9.5% petroleum ether extract and 4.3% sodium sulfate on the basis 100% active material. The 5% aqueous solution of active material has a colour corresponding to 45 units on the Klett scale.

EXAMPLE 5

The sulfation in Example 4 is repeated in a reactor formed of tubes having the dimensions as shown in Example 1, except using the distribution system for the reactants and equalizing air as shown in FIG. 4, wherein the ends of the gas reactant nozzle is recessed by 3 mm from the converging inlet of the reaction tube. Air and reactant flow rates and the other operating conditions are the same as in Example 4. The neutralized product has analytic characteristics of solubility and colour substantially the same as in the product of Example 4.

EXAMPLE 6

This example shows the influence of gas speed in the reaction tubes on the colour of the product, relating to the sulfation of the fraction of fatty alcohols in Example 4. The characteristics of the reactor are those shown in Example 1. The total air flow is 10.3 $Nm^3/h$ per tube, 8.3 $Nm^3/h$ per tube of which entering as diluting air for sulfur trioxide and at an average 2 $Nm^3/h$ per tube as equalizing air. The superficial air speed related to the tube cross-section is about 30/m/sec. The organic reactant flow rate is reduced relative to that in Example 4, in order to prevent a too high gas reactant concentration from affecting the colour of the product. The organic reactant is supplied to the reactor at a rate of 3.6 kg/h per tube and sulfur trioxide is evaporated in the main air stream at a rate of 1.07 kg/h per tube. Sulfur trioxide concentration in the gas reactant is 3.5% by volume and, as an average, it drops to 2.8% by volume when the gas reactant encounters the equalizing air and contacts the organic reactant. The temperature of the organic reactant, gas reactant and equalizing air are those as in Example 4. Cooling water at 46° C. is circulated within the reactor in order to maintain the reaction mixture outlet at 51° C. After separation of the exhausted gas, the resultant fatty alcohol sulfate is cooled and neutralized as shown in Example 4. The colour of the product neutralized in 5% active material aqueous solution corresponds to 75 units on Klett scale. As in Example 4, the air flow rate for diluting sulfur trioxide is then increased to 15 $Nm^3/h$, the other conditions being left unaltered. The colour of the novel product neutralized in 5% active material aqueous solution corresponds to 37 units on the Klett scale. It is still more significant that the increase in air flow rate causes for some instants the outlet of very dark sulfation product from the reactor. The liquid reactant which, at a low gas speed, tends to stay for too a long time within the reaction tubes and darken is "blown out", while the new flow regime corresponding to the increased gas flow rate is set up.

What is claimed is:

1. Apparatus for continuously reacting a liquid material with a gas comprising a plurality of parallel reaction tubes, a single feed chamber for the liquid reactant, a single feed chamber for the gas reactant, means for metering and introducing said liquid reactant from its associated said chamber circumferentially into each of said tubes, nozzles for metering and introducing said gas reactant from its associated said chamber centrally into each of said tubes beyond the introducing opening for said liquid reactant, means for introducing an inert gas from a further single chamber of uniform pressure into each of said tubes through an annular space comprised between said gaseous reactant introducing nozzles and the inner surface of said reaction tubes, the inlet openings for the inert gas being sized, in relation to the inert gas flow rate, to impart pressure drops to said inert gas flows at the entrance of said reaction tubes which are only small fractions of the pressure drop in the metering and introducing nozzles of said gaseous reactant, so that said inert gas distributes to said tubes to equalize the pressure in said tubes.

2. Apparatus as claimed in claim 1, in which said inlet openings for the inert gas are sized such that the inlet pressure drop of said inert gas is 20–120 mm. of water, and said metering and introducing nozzles for said gas reactant are so dimensioned that the pressure drop of said gas reactant is 0.10–0.35 $kg/cm^2$.

* * * * *